United States Patent [19]

Oswald et al.

[11] Patent Number: 5,040,745
[45] Date of Patent: Aug. 20, 1991

[54] SETTING DEVICE FOR A CONTROL SURFACE

[75] Inventors: Peter Oswald, Bernhaupten; Josef Nagler, Rothenbach, both of Fed. Rep. of Germany

[73] Assignee: Diehl GmbH & Co., Fed. Rep. of Germany

[21] Appl. No.: 141,402

[22] Filed: Jan. 4, 1988

[30] Foreign Application Priority Data

Jan. 30, 1987 [DE] Fed. Rep. of Germany ....... 3702733

[51] Int. Cl.[5] .............................................. F42B 10/62
[52] U.S. Cl. .................................. 244/3.21; 244/75 R
[58] Field of Search ...................... 74/89.15, 424.8 R; 244/3.21, 3.24, 75 R

[56] References Cited

U.S. PATENT DOCUMENTS

| 2,504,767 | 4/1950 | Wallis | 244/75 R |
| 3,200,587 | 8/1965 | Tolson | 244/3.21 |
| 3,568,957 | 3/1971 | Wood | 74/89.15 |
| 4,180,222 | 12/1979 | Thornburg | 244/75 R |

FOREIGN PATENT DOCUMENTS

| 746809 | 8/1944 | Fed. Rep. of Germany .... 244/75 R |
| 745795 | 12/1944 | Fed. Rep. of Germany .... 244/75 R |

Primary Examiner—Richard W. Wendtland
Attorney, Agent, or Firm—Scully, Scott, Murphy & Presser

[57] ABSTRACT

A setting device for a control surface for guided ammunition, including a spindle which is driven by a drive motor, a nut being seated on the spindle, which nut incorporates a projection on its outer cylindrical circumference, with which projection there engages a shaft of the control surface. The nut is guided within a sleeve, whereby the tolerance between the nut and the spindle, and the sliding tolerance or fit between the nut and the sleeve are selected such that the stresses or loads which are transmitted by the shaft of the control surface are assumed by the sleeve, and in which the projection engages into an axial slot in the sleeve.

11 Claims, 1 Drawing Sheet

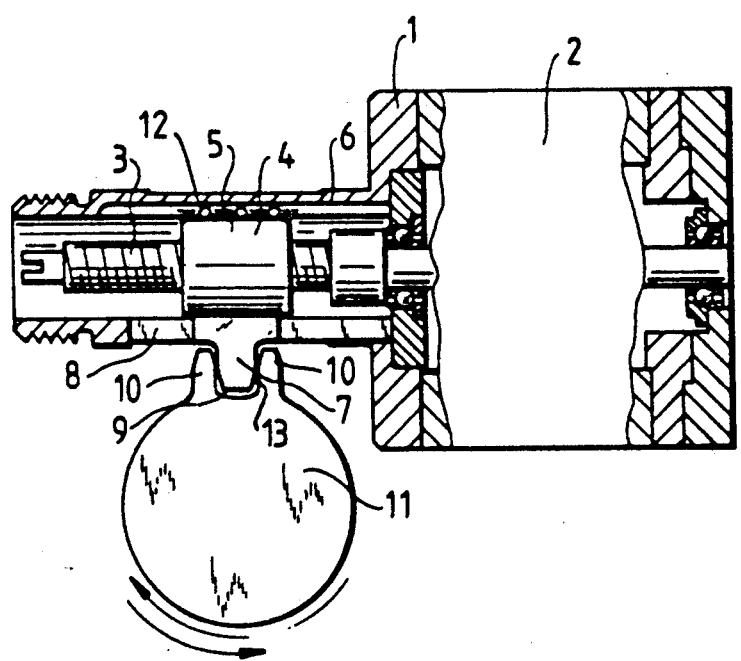

SETTING DEVICE FOR A CONTROL SURFACE

BACKGROUND OF THE INVENTION

1. Field of the Invention

The present invention relates to a setting device for a control surface for guided ammunition, including a spindle which is driven by a drive motor, a nut being seated on the spindle, which nut incorporates a projection on its outer cylindrical circumference, with which projection there engages a shaft of the control surface.

2. Discussion of the Prior Art

A setting device of that type for a control surface is known from the disclosure of German Patent 34 42 899. In this prior art setting device for a control surface, the nut lacks an external guidance or guide element, whereby the forces acting from the control surface through the shaft of the control surface are transmitted directly to the screw threads which are present between the nut and the spindle, and must be assumed by the spindle. Consequently, this limits the degree of efficiency of the device.

SUMMARY OF THE INVENTION

Accordingly, it is an object of the present invention to provide a setting device for a control surface of the above-mentioned type, which operates with an enhanced degree of efficiency.

Inventively, the foregoing object is achieved for a setting device for a control surface of the above-mentioned type, in that the nut is guided within a sleeve, whereby the tolerance between the nut and the spindle, and the sliding tolerance or fit between the nut and the sleeve are selected such that the stresses or loads which are transmitted by the shaft of the control surface are assumed by the sleeve, and in which the projection engages into an axial slot in the sleeve.

The fit or tolerance between the nut and the spindle is hereby selected so as to allow the nut to tilt or cant on the spindle. A sliding fit is provided between the outer circumference of the nut and the sleeve. Hereby, the forces which are transmitted from the control surface through the shaft of the control surface to the nut are assumed by the sleeve, without leading to a clamping of the nut on the spindle. In conformance therewith, there are low losses along the drive train between the motor and the shaft of the control surface. Thus, there is obtained a comparatively high degree of efficiency.

Through the employment of the inventive setting device for the control surface, and without any leverage, on the one hand, there can be transmitted large forces for the movement of the control surface and, on the other hand, assumed upon the loading of the control surface.

The setting device for the control surface is compactly constructed. The shaft of the control surface is located close to the spindle or, respectively, the drive motor. As a result, there are obtained small moving masses, which leads to an expedient dynamic behavior. Moreover, there is achieved a high degree of strength during accelerations. The play between components within the drive train is low.

BRIEF DESCRIPTION OF THE DRAWING

Advantageous embodiments of the invention may now be readily ascertained from the following detailed description of an exemplary embodiment thereof, taken in conjunction with the accompanying single figure of drawing schematically illustrating the inventive setting device for a control surface.

DETAILED DESCRIPTION

A carrier 1 is rigidly positioned within a housing (not shown). A drive motor 2 is fastened and supported on the carrier 1. A threaded spindle 3 is coupled with the drive motor 2. A nut 4 with a cylindrical outer circumference 5 is seated on the threaded spindle 3.

A sleeve 6 is formed on the carrier 1. The nut 4 is slidably displaceable within the sleeve, whereby a sliding fit is provided between the cylindrical outer mantle 5 and the sleeve 6. The fit or tolerance between the threaded spindle 3 and the nut 4 is such that the nut 4 can tilt or cant the threaded spindle 4, without the sleeve 6. Between the nut 4 and the sleeve 6 there is provided a linear-roller bearing guidance 12. Instead thereof, the sleeve 6 and/or the nut 4 can also be coated with a material possessing a ready sliding ability, or can be constituted of such a material; in essence, a low-friction material.

A projection 7 is formed on the nut 4. This projection extends through an axial slot in the sleeve 6. As a result thereof, this prevents any turning along by the nut 4 during a rotation of the threaded spindle 3.

The projection 7 possesses a partially circular engaging or contact surface 9, which is extended over by a pair of fingers 10 of a shaft 11 of a control surface. As a result thereof, this creates a space-saving and extensively narrow tolerance or freedom from play, and an easily assembled coupling of the control surface shaft 11 with the nut 4. Moreover, the control surface shaft 11 is located close to the drive motor 2, and the masses which are to be moved are small. In order to improve upon the rolling behavior between the projection 7 and the pair of fingers 10, the projection 7 and the pair of fingers 10 each possess a gear-toothed configuration 13.

The forces which are transmitted during flight from the control surface (not shown) through the control surface shaft 11 to the nut 4 are assumed by the sleeve 6. Consequently, the friction between the thread surfaces on the nut 4 and the threaded spindle 3 remains low. Consequently, the drive motor 2, for effecting the displacement of the control surface, has to overcome only comparatively small frictional forces. The degree of efficiency of the transmission of force between the motor and the control surface is correspondingly high.

What is claimed is:

1. In a guided projectile having at least one control surface with a setting device, said setting device comprising:
    a spindle driven by a drive motor for driving said spindle, and a nut seated on the spindle, said nut having a projection on a cylindrical outer surface thereof, said projection engaging said control surface through a drive which transmits torque between the nut and the control surface through said projection;
    the improvement comprising a sleeve in which said nut is guided, the fit between the nut and the sleeve is a low friction fit which allows torque to be transmitted between the nut and the control surface, the fit between the nut and the spindle allows the axis of the nut to pivot relative to the axis of the spindle while transmitting none of the torque between the nut and the control surface, the fit between the nut and the spindle and the sliding fit between the nut and the sleeve being selected such that the loading forces transmitted from the control surface are assumed by the sleeve, and said projection extends through an axial slot formed in said sleeve.

2. A setting device for a control surface as claimed in claim 1, wherein the sleeve is rigidly connected with a carrier for said drive motor.

3. A setting device for a control surface as claimed in claim 1, wherein the shaft of the control surface has a pair of fingers engaging over the projection.

4. A setting device for a control surface as claimed in claim 3, wherein the projection includes a partially circular engaging surface for contacting the pair of fingers.

5. A setting device for a control surface as claimed in claim 1, wherein the projection and the pair of fingers have gear-toothed configurations.

6. A setting device for a control surface as claimed in claim 1, wherein said sleeve or said nut are coated with a material having a sliding ability or are constituted of such a low-friction material.

7. A setting device for a control surface as claimed in claim 1, wherein a linear-roller bearing guidance is arranged between said sleeve and said nut.

8. A setting device according to claim 1, wherein:
the sleeve defines an axially extending bore;
the nut is slidably disposed in said bore;
the sleeve further defines an axially extending recess radially extending outward from said bore; and
the setting device further comprises roller bearing means disposed in said axially extending recess, between and in engagement with the sleeve and the nut, to provide said low friction fit between the sleeve and the nut.

9. A setting device according to claim 8, wherein the sleeve includes an inside radial shoulder extending outward from said bore and forming an end of the axial recess in the sleeve.

10. A setting device according to claim 9, wherein the axial recess is radially opposite the axial groove.

11. A setting device according to claim 10, wherein the sleeve is integrally connected to a carrier for the drive motor.

* * * * *